(12) United States Patent
Sasaki et al.

(10) Patent No.: US 11,608,118 B2
(45) Date of Patent: Mar. 21, 2023

(54) POP-UP HOOD APPARATUS FOR VEHICLE

(71) Applicant: HONDA MOTOR CO., LTD., Tokyo (JP)

(72) Inventors: Kazutada Sasaki, Wako (JP); Masato Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 425 days.

(21) Appl. No.: 16/808,437

(22) Filed: Mar. 4, 2020

(65) Prior Publication Data

US 2020/0290683 A1    Sep. 17, 2020

(30) Foreign Application Priority Data

Mar. 11, 2019   (JP) .............................. JP2019-044044

(51) Int. Cl.
*B62D 25/12* (2006.01)
*E05B 77/12* (2014.01)
(Continued)

(52) U.S. Cl.
CPC .............. *B62D 25/12* (2013.01); *E05B 77/12* (2013.01); *E05B 81/16* (2013.01); *E05B 83/243* (2013.01)

(58) Field of Classification Search
CPC ......... B62D 25/12; E05B 77/12; E05B 81/16; E05B 83/243; E05B 77/08; B60R 21/38
See application file for complete search history.

(56) References Cited

U.S. PATENT DOCUMENTS

| 10,988,105 B2 * | 4/2021 | Gunji | ...................... B60R 21/38 |
| 2007/0074919 A1 * | 4/2007 | Hirata | ...................... B60R 21/34 |
| | | | 180/69.2 |

FOREIGN PATENT DOCUMENTS

| CN | 204222801 | 3/2015 |
| CN | 105829172 | 8/2016 |

(Continued)

OTHER PUBLICATIONS

Japanese Notice of Allowance for Japanese Patent Application No. 2019-044044 dated Mar. 8, 2022.

(Continued)

*Primary Examiner* — Christine M Mills
*Assistant Examiner* — Thomas L Neubauer
(74) *Attorney, Agent, or Firm* — Amin, Turocy & Watson, LLP

(57) ABSTRACT

A pop-up hood apparatus includes a hood, a hood lock mechanism, an actuator for raising, and an auxiliary support section configured to support a side edge portion of the hood from below upon an actuation of the actuator. The auxiliary support section includes a load receiving block configured to support the side edge portion of the hood from below, a biasing member configured to bias the load receiving block upward, a displacement restricting member configured to restrict upward displacement of the load receiving block, and a restriction releasing section configured to release upward displacement restriction of the load receiving block according to upward displacement of the hood lock mechanism. The displacement restricting member is displaced to a position that abuts a lower surface of the load receiving block when the load receiving block that has been released upward displacement restriction is displaced upward by a predetermined amount or more.

5 Claims, 10 Drawing Sheets

(51) Int. Cl.
      *E05B 81/16*       (2014.01)
      *E05B 83/24*       (2014.01)

(56) References Cited

FOREIGN PATENT DOCUMENTS

| | | |
|---|---|---|
| CN | 111605625 | 9/2020 |
| DE | 10108880 | 9/2002 |
| DE | 102013001585 | 8/2014 |
| JP | 2002-029370 | 1/2002 |
| JP | 2006-518016 | 8/2006 |
| JP | 2007-010082 | 1/2007 |
| JP | 2014-015112 | 1/2014 |
| JP | 2015-147506 | 8/2015 |
| JP | 2016-088399 | 5/2016 |

OTHER PUBLICATIONS

Chinese Office Action for Chinese Patent Application No. 202010141135.5 dated Jan. 7, 2022.

\* cited by examiner

POP-UP HOOD APPARATUS FOR VEHICLE

CROSS-REFERENCE TO RELATED APPLICATION

Priority is claimed on Japanese Patent Application No. 2019-044044, filed Mar. 11, 2019, the content of which is incorporated herein by reference.

BACKGROUND OF THE INVENTION

Field of the Invention

The present invention relates to a pop-up hood apparatus for a vehicle having a hood that is displaced upward upon an input of an impact.

Description of Related Art

As a technology of a hood for vehicle such as a bonnet hood or the like, a pop-up hood apparatus configured to displace a hood upward using an actuator during input of an impact and smoothly receive the impact using the hood is known (for example, see Japanese Unexamined Patent Application, First Publication No. 2016-88399).

In the pop-up hood apparatus disclosed in Japanese Unexamined Patent Application, First Publication No. 2016-88399, a hood lock mechanism configured to fix a front end portion of the hood on a side of a vehicle body is supported on a substantially central section in a vehicle width direction via a vertically slidable mechanism, and locked and fixed at an initial position by a locking section. Then, a pair of actuators are disposed below both of left and right sides of the front end portion of the hood and when an input of an impact is detected by a sensor, both of the actuators are operated to push the front end portion of the hood upward.

In addition, the actuators and a locking section of the hood lock mechanism at a substantially center in the vehicle width direction are interlocked by an interlocking mechanism using an operating cable and when the actuators are operated at the time the impact is detected, locking of the hood lock mechanism is released in conjunction with the actuation of the actuators. Accordingly, the hood lock mechanism can be slid and displaced upward, and the front end portion of the hood is raised by the operation of the left and right actuators.

In addition, in the case of the pop-up hood apparatus disclosed in Japanese Unexamined Patent Application, First Publication No. 2016-88399, a restricting member configured to restrict downward displacement of the hood lock mechanism (the hood) when the hood lock mechanism is raised by the actuation of the actuators is attached to a support section of the hood lock mechanism on a front section of the vehicle body. The restricting member is pivoted and displaced toward below the hood lock mechanism and supports a lower surface of the hood lock mechanism from below when the hood lock mechanism is raised by a predetermined amount or more.

SUMMARY OF THE INVENTION

In the pop-up hood apparatus disclosed in Japanese Unexamined Patent Application, First Publication No. 2016-88399, a dedicated restricting member restricts downward displacement of the hood lock mechanism when the hood lock mechanism is raised in conjunction with the actuation of the actuators. For this reason, in the case of the pop-up hood apparatus, even though a load applied to an upper surface of the hood can be stably received, the number of parts is increased to an extent that dedicated restricting parts are provided, which easily leads to a sudden rise in manufacturing costs, or increases in size and weight of the entire apparatus.

An aspect of the present invention is directed to providing a pop-up hood apparatus for a vehicle capable of reducing the number of parts and achieving reduction in manufacturing costs and reduction in size and weight of the apparatus.

A pop-up hood apparatus for a vehicle according to the present invention employs the following configurations.

(1) A pop-up hood apparatus for a vehicle according to an aspect of the present invention includes a hood configured to close an opening section of an external section of a vehicle body; a hood lock mechanism configured to fix a substantially central section of the hood in a vehicle width direction to a side of a vehicle body; an actuator configured to displace the hood upward together with the hood lock mechanism in a case a predetermined condition is satisfied; and an auxiliary support section configured to support a side edge portion of the hood from below in a case the hood is displaced upward according to an actuation of the actuator, wherein the auxiliary support section includes: a load receiving block configured to support the side edge portion of the hood from below; a first biasing member configured to bias the load receiving block upward; a displacement restricting member configured to restrict upward displacement of the load receiving block from an initial position against a biasing force of the first biasing member; and a restriction releasing section configured to release upward displacement restriction of the load receiving block by the displacement restricting member according to upward displacement of the hood lock mechanism, and the displacement restricting member is configured to be displaceable to a position at which the displacement restricting member abuts a lower surface of the load receiving block in a case the load receiving block that has been released the upward displacement restriction is displaced upward by a predetermined amount or more.

According to the aspect of the above-mentioned (1), the hood closes an opening section of the vehicle body while being fixed to the hood lock mechanism during normal traveling. In a case the predetermined condition is satisfied, the actuator is actuated from this state, and the actuator displaces the movable block of the support mechanism upward. When the movable block is raised, the hood lock mechanism is raised together with the movable block while the hood is fixed. As the hood lock mechanism is raised in this way, the restriction releasing section releases upward displacement restriction of the load receiving block by the displacement restricting member. When the upward displacement restriction of the load receiving block is released, the load receiving block is raised by receiving a biasing force of the first biasing member, the side edge portion of the hood is supported from below. Then, in a case the load receiving block is raised by the predetermined amount or more by receiving the biasing force of the first biasing member, the displacement restricting member is displaced to the position abutting the lower surface of the load receiving block. As a result, descending of the side edge portion of the hood is restricted by the displacement restricting member.

(2) In the aspect of the above-mentioned (1), the predetermined condition may be a condition of determining that there is in an emergency.

According to the aspect of the above-mentioned (2), when the actuator is actuated during an emergency, the displacement restricting member is displaced to the position abutting the lower surface of the load receiving block, and descending of the side edge portion of the hood is restricted by the displacement restricting member.

(3) In the aspect of the above-mentioned (1) or (2), the pop-up hood apparatus for a vehicle may include a second biasing member configured to displace the displacement restricting member in between the vehicle body and the lower surface of the load receiving block in a case the load receiving block that has been released the upward displacement restriction is displaced upward at the predetermined amount or more.

According to the aspect of the above-mentioned (3), upon raising of the hood by the actuator, in a case the load receiving block that releases the upward displacement restriction is displaced upward by a predetermined amount or more, the displacement restricting member is rapidly displaced in between the vehicle body and the lower surface of the load receiving block by receiving the biasing force of the second biasing member, and restricts downward displacement of the load receiving block. When this configuration is employed, the lower surface of the side edge portion of the hood can be rapidly supported by the displacement restricting member upon raising of the hood with a simple configuration.

(4) In the aspect of the above-mentioned (3), the load receiving block may have a locking protrusion protruding outward from a side surface, the displacement restricting member may have a lever piece pivotably supported on the side of the vehicle body and engaged with the locking protrusion to restrict upward displacement of the load receiving block, the lever piece that may be pivotably biased by the second biasing member in one direction in which it is engageable with the locking protrusion and that may be configured to release engagement with the locking protrusion by a pivotal operation in another direction by the restriction releasing section, and the displacement restricting member may be configured to pivot in the one direction and abut the lower surface of the load receiving block in a case the load receiving block receives the biasing force of the first biasing member and is displaced upward by the predetermined amount or more.

In a normal state, in a state in which the lever piece of the displacement restricting member is pivoted in one direction, the lever piece is engaged with the locking protrusion of the load receiving block. Thus, the load receiving block is maintained in a descending state. When the hood lock mechanism is raised by an actuation of the actuator from this state, the lever piece of the displacement restricting member is pivoted in another direction through the restriction releasing section, and engagement of the lever piece with the locking protrusion of the load receiving block is released. As a result, when the load receiving block is raised by receiving the biasing force of the first biasing member and the load receiving block is displaced upward by a predetermined amount or more, the displacement restricting member is pivoted in the one direction by receiving the biasing force of the second biasing member. Accordingly, the displacement restricting member enters below the load receiving block, the lever piece abuts the lower surface of the load receiving block, and downward displacement of the load receiving block is restricted.

According to the aspect of the above-mentioned (4), the pop-up hood apparatus can realize rising displacement restriction at an initial position of the load receiving block by the displacement restricting member and descending displacement restriction of the load receiving block in a raised state using a simple configuration.

(5) In the aspect of any one of the above-mentioned (1) to (4), the restriction releasing section may include: an operating cable having one end portion connected to the displacement restricting member; and an operation converting section configured to convert rising displacement of the hood lock mechanism into a drawing operation of other end portion of the operating cable.

According to the aspect of the above-mentioned (5), when the hood lock mechanism is raised by an actuation of the actuator, rising displacement of the hood lock mechanism is converted into a drawing operation of the other end portion of the operating cable by the operation converting section. Accordingly, the displacement restricting member is operated by drawing the operating cable.

In the pop-up hood apparatus of the configuration, since rising displacement of the hood lock mechanism at substantially a center in the vehicle width direction is converted into an operation and then transmitted to the displacement restricting member of the side portion in the vehicle width direction via the operating cable having a high degree of deformation freedom, there is an advantage that the degree of freedom in disposition of the apparatus in the vehicle is high. Accordingly, when this configuration is employed, even in the vehicle in which a disposition space is limited, the apparatus can be relatively easily installed.

(6) In the aspect of the above-mentioned (5), the operation converting section may be constituted by a cable drawing lever, a pivoting amount of which is controlled by a cam mechanism.

According to the aspect of the above-mentioned (6), since drawing of the operating cable can be accurately controlled according to a shape of the cam surface of the cam mechanism, the displacement restricting member can be displaced as desired according to rising displacement of the hood.

(7) In the aspect of any one of the above-mentioned (1) to (6), a stopper rubber that is configured to abut the lower surface of the hood may be provided on an upper section of the load receiving block in a state in which the load receiving block is at an initial position.

According to the aspect of the above-mentioned (7), in comparison with the case in which the load receiving block of the auxiliary support section and the stopper rubber are separately installed on the vehicle body, a space occupied by parts at a circumferential edge of the opening section of the vehicle body can be reduced. In addition, when this configuration is employed, an impact when the load receiving block abuts the lower surface of the hold can be reduced by the stopper rubber during raising of the hood by the actuator.

In the aspect of the present invention, during raising of the hood by the actuator, when the load receiving block that releases upward displacement restriction is displaced upward by a predetermined amount or more, the displacement restricting member is configured to be displaced to a position abutting the lower surface of the load receiving block. For this reason, there is no need to separately install a dedicated restricting member configured to restrict descending of the hood during raising of the hood by the actuator. Accordingly, when the present invention is employed, reduction in manufacturing costs and reduction in size and weight of the apparatus can be achieved by reducing the number of components.

DETAILED DESCRIPTION OF THE INVENTION

Figure 1:
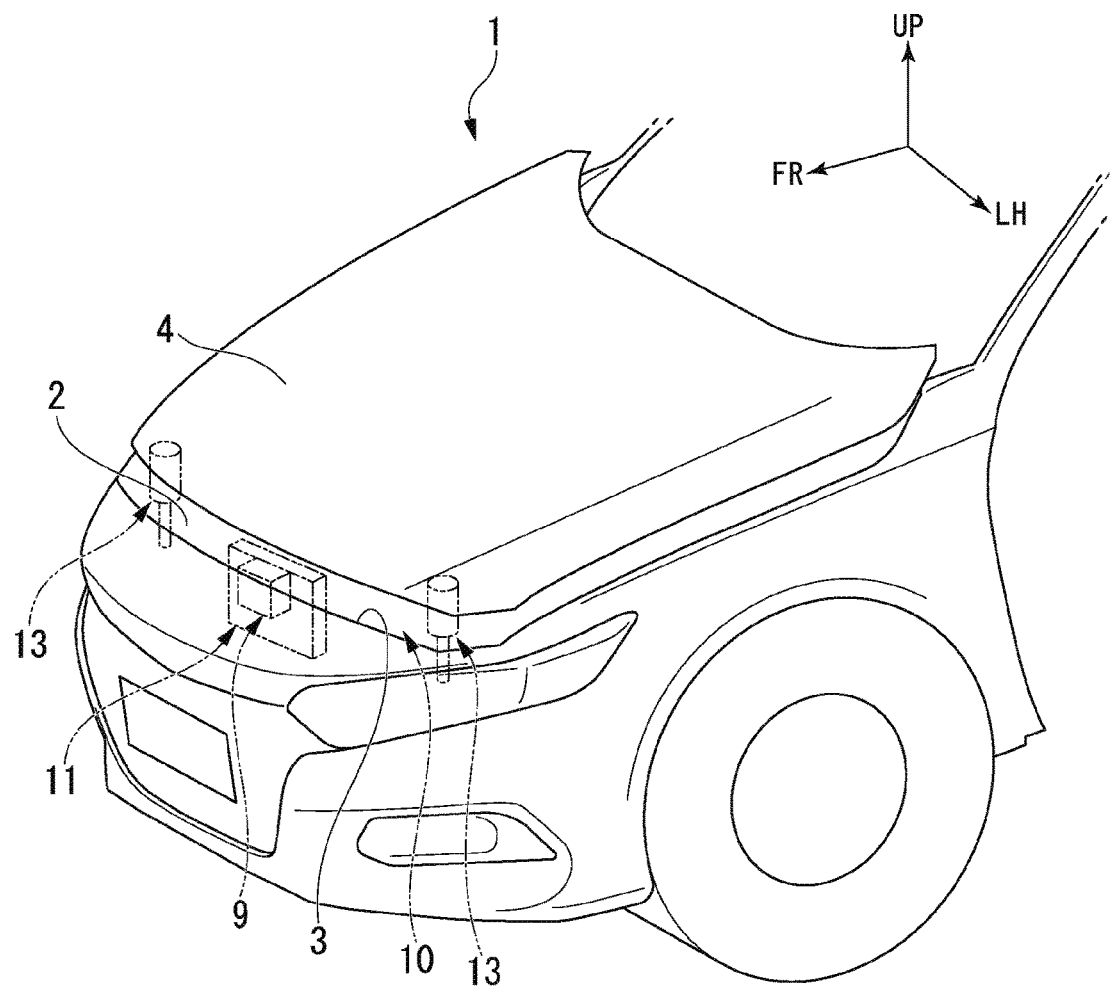
FIG. 1 is a perspective view showing a state in which a pop-up hood apparatus for a vehicle of an embodiment has been operated.

Hereinafter, an embodiment of the present invention will be described with reference to the accompanying drawings. Further, directions of forward, rearward, leftward, rightward, upward and downward, in the following description are the same as directions in a vehicle described below unless the context clearly indicates otherwise. In addition, in appropriate places in the drawings used in the following description, an arrow UP indicates an upward direction with respect to a vehicle, an arrow FR indicates a forward direction with respect to the vehicle, and an arrow LH indicates a leftward direction with respect to the vehicle.

Vehicle Configuration

Figure 2:
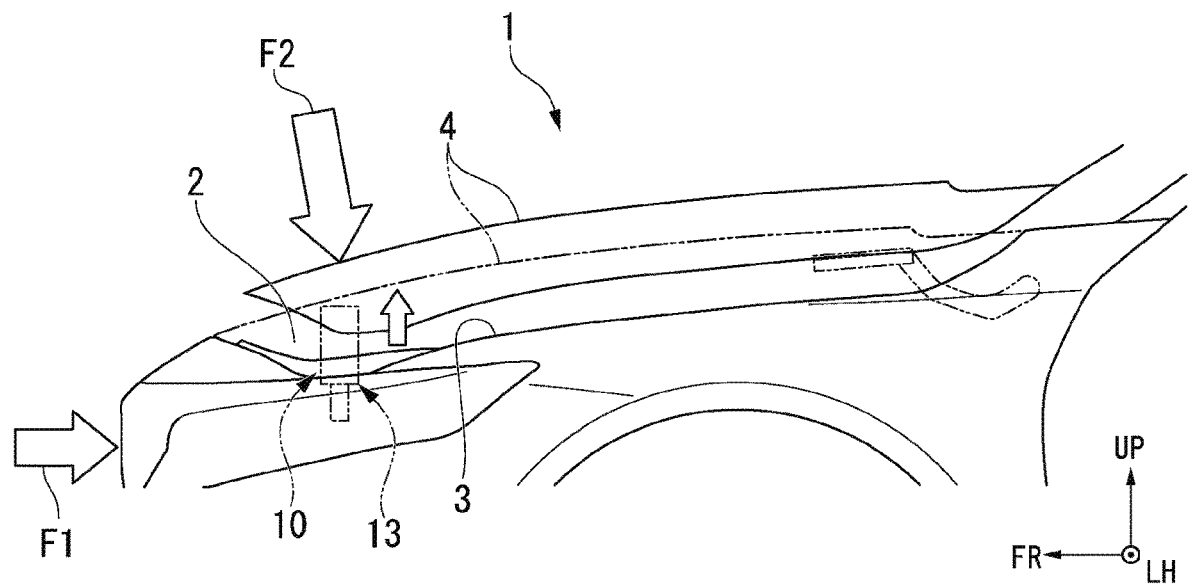
FIG. 2 is a side view showing a state in which the pop-up hood apparatus for a vehicle of the embodiment has been operated.
Figure 3:
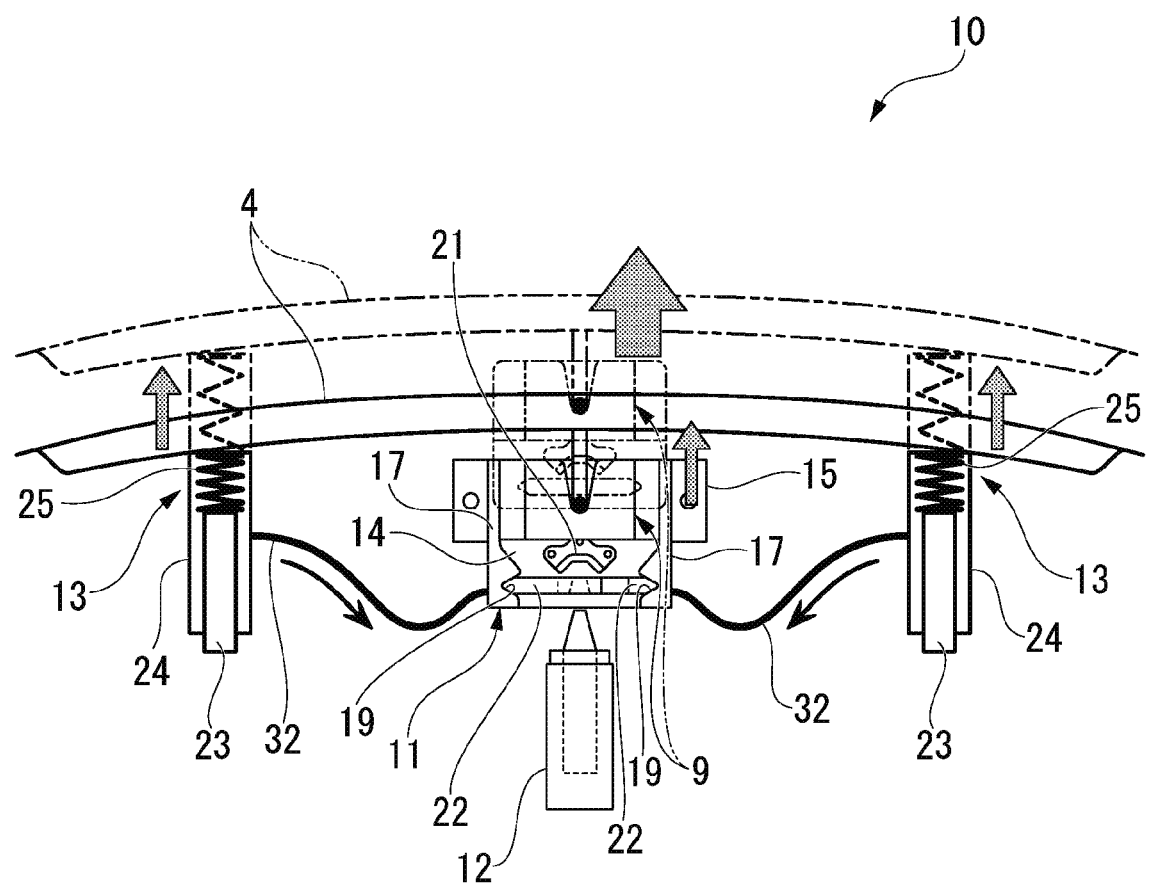
FIG. 3 is a front view showing a schematic configuration of the pop-up hood apparatus of the embodiment.

FIG. 1 is a perspective view showing a front section of a vehicle 1 of an embodiment from above and to the front, and FIG. 2 is a left side view of the front section of the vehicle 1. In addition, FIG. 3 is a front view showing a schematic configuration of a pop-up hood apparatus 10 installed on a front section of the vehicle 1.

The vehicle 1 includes a driving chamber 2 in which a driving source such as an engine, a motor, or the like, is provided in front of a passenger compartment. An opening section 3 having a substantially rectangular shape is provided in an upper section of the driving chamber 2. The opening section 3 is opened and closed by a hood 4. The hood 4 has a substantially hollow structure formed by, for example, joining a plurality of metal plates. Hinges (not shown) are attached to left and right side edge portions of the vehicle body close to a rear section of the opening section 3. Movable pieces of the hinges are connected to left and right side edge portions of a rear section of the hood 4. The hood 4 can be opened and closed with respect to the front of the opening section 3 about a pivot shaft of the left and right hinges during normal use.

A hood lock mechanism 9 is provided at a center of the vehicle body on the side of the front section of the opening section 3. The hood lock mechanism 9 keeps a locked state by fixing the front section of the closed hood 4 to the side of the vehicle body. The hood lock mechanism 9 allows release of the locking via a lever operation or the like from the inside of the passenger compartment.

Further, in the vehicle 1 of the embodiment, while the driving chamber 2 is disposed in the front section of vehicle body and the opening section 3 above the driving chamber 2 is closed by the hood 4, the same structure can also be applied to a vehicle in which a luggage compartment is disposed in the front section of the vehicle body and an opening section above the luggage compartment is closed by a hood.

Pop-Up Hood Apparatus

The pop-up hood apparatus 10 includes the hood 4, the hood lock mechanism 9, a support mechanism 11 configured to support the hood lock mechanism 9 such that it is able to be raised and lowered with respect to the vehicle body, an actuator 12 configured to displace a central region of the front section of the hood 4 upward upon emergency (an input of an impact F1 or the like), and a pair of auxiliary support sections 13 configured to support left and right side edge portions of the hood 4 close to the front section from below upon an actuation of the actuator 12.

Figure 4:
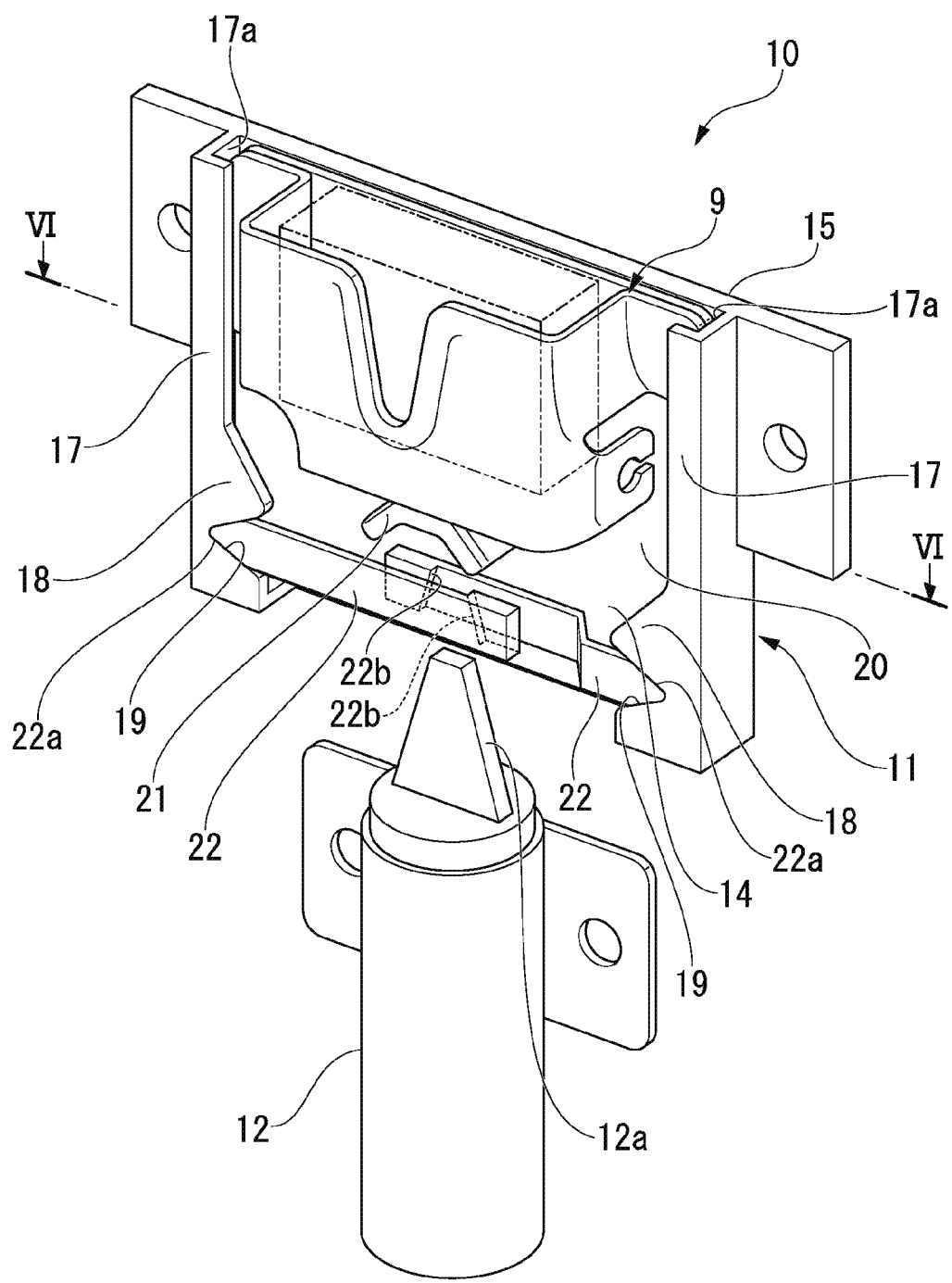
FIG. 4 is a perspective view showing a part of the pop-up hood apparatus of the embodiment.
Figure 5:
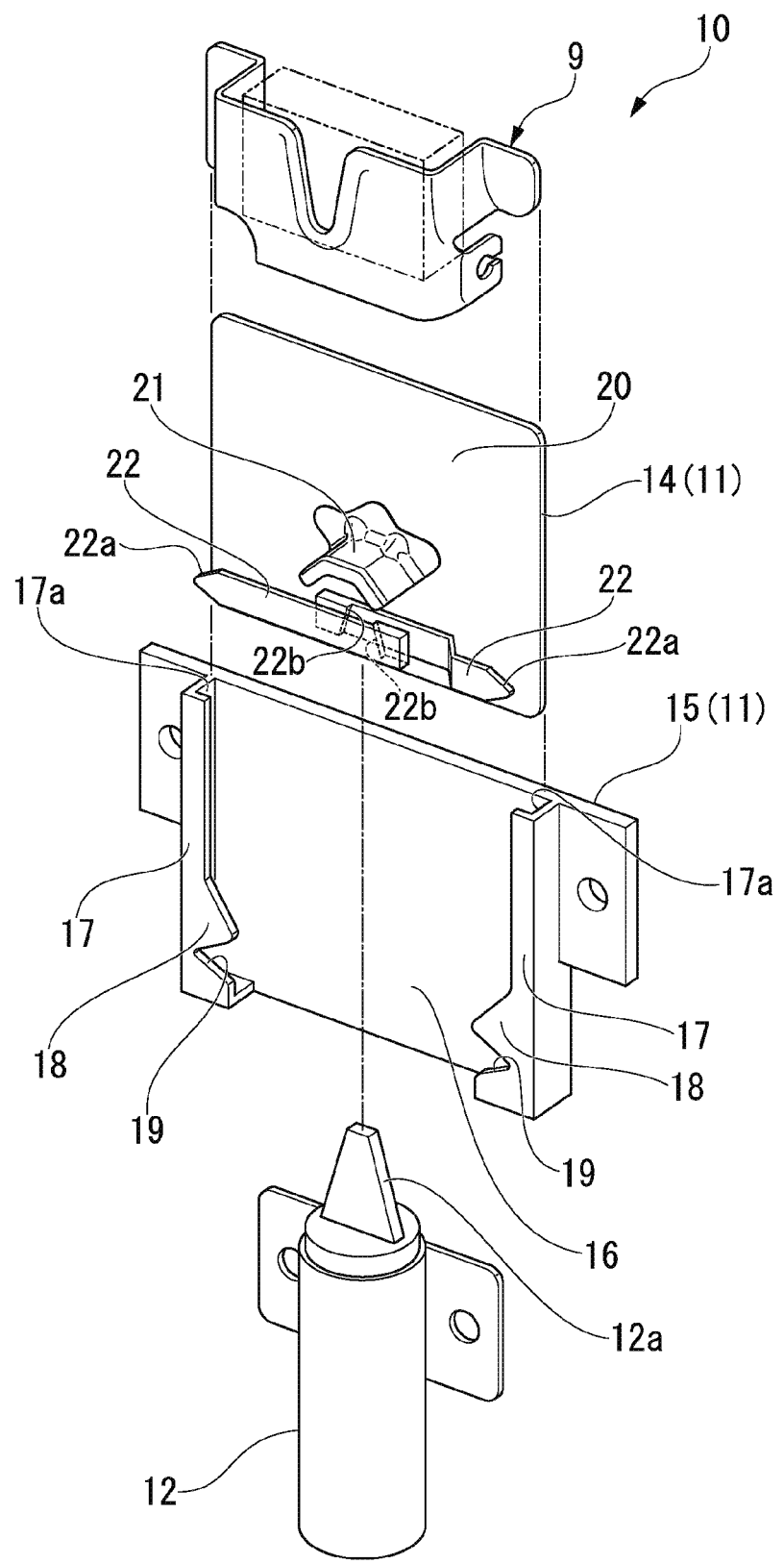
FIG. 5 is an exploded perspective view of a part of the pop-up hood apparatus of the embodiment.
Figure 6:
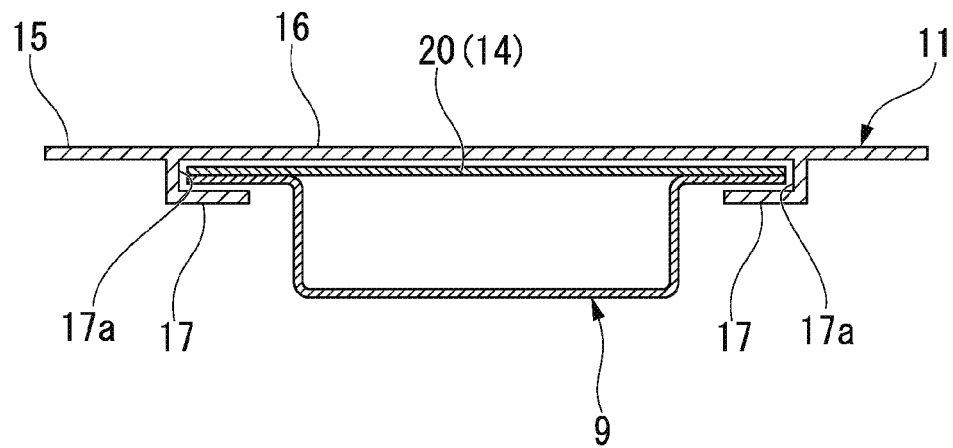
FIG. 6 is a cross-sectional view taken along line VI-VI of FIG. 4 of the pop-up hood apparatus of the embodiment.

FIG. 4 is a perspective view of the support mechanism 11 configured to support the hood lock mechanism 9 and the actuator 12, and FIG. 5 is a view showing the support mechanism 11 exploded together with the actuator 12. In addition, FIG. 6 is a cross-sectional view taken along line VI-VI in FIG. 4 of the support mechanism 11.

The support mechanism 11 has a movable block 14 configured to support the hood lock mechanism 9, and a base block 15 fixed to a substantially central section of the front section of the vehicle body in the vehicle width direction and configured to support the movable block 14 vertically slidably.

The base block 15 has a fixed base wall 16 fixed to a skeleton member of the front section of the vehicle body through bolt fastening or the like, and a pair of left and right guide rail sections 17 protruding from a front surface of the fixed base wall 16. The left and right guide rail sections 17 are formed such that guide grooves 17a substantially extending in the upward/downward direction are formed to face each other in the vehicle width direction. Protruding sections 18 protruding inward in the vehicle width direction are provided in the vicinity of lower ends of the left and right guide rail sections 17, and engagement grooves 19 recessed in substantially a V shape are formed in edge portions of the protruding sections 18 inside in the vehicle width direction.

The movable block 14 has a movable base wall 20 having left and right side edge portions slidably supported by the left and right guide rail sections 17 of the base block 15, a load receiving member 21 fixedly installed on a central section of a front surface of the movable base wall 20 in the vehicle width direction, and a pair of left and right locking claws 22 slidably supported on a front surface of the movable base wall 20 in the vehicle width direction at a position below the load receiving member 21.

The load receiving member 21 is a member which a wedge section 12a of an upper end of a movable section of the actuator 12 abuts to receive a push-up load from the actuator. The movable base wall 20 is displaced upward while being guided to the left and right guide rail sections 17 when the load receiving member 21 receives a push-up load from the actuator 12.

Locking claws 22 have locking sections 22a having a substantially triangular shape and inserted into and engaged with the engagement grooves 19 corresponding to the left and right guide rail sections 17. The locking claws 22 are biased by springs (not shown) in a direction in which the locking sections 22a are inserted into the corresponding engagement grooves 19. In addition, cam surfaces 22b inclined from an upper end side toward a lower end side outside in the vehicle width direction are formed on the locking claws 22. In each of the cam surfaces 22b, during an actuation of the actuator 12, when the wedge section 12a of the actuator 12 is moved upward, an inclined portion of the wedge section 12a slides. The locking claws 22 are slid and displaced in a direction away from the engagement grooves 19 as the inclined cam surface 22b is pressed by the inclined portion of the wedge section 12a. Accordingly, the locking sections 22a of the locking claws 22 are removed from the corresponding engagement grooves 19, and locking of the movable block 14 is released.

The actuator 12 is constituted by, for example, a powder-activated cylinder apparatus or the like from which a rod section protrudes when receiving a signal from a controller (not shown). In the embodiment, when an impact detecting sensor (not shown, for example, an acceleration sensor) installed on a front bumper or the like detects an impact of a predetermined level or more, the controller outputs an operation signal to the actuator 12. In the actuator 12, since the rod section protrudes due to a powder action or the like, the wedge section 12a of the tip performs locking release of the movable block 14 and push-up of the movable block 14 through the load receiving member 21.

Figure 7:
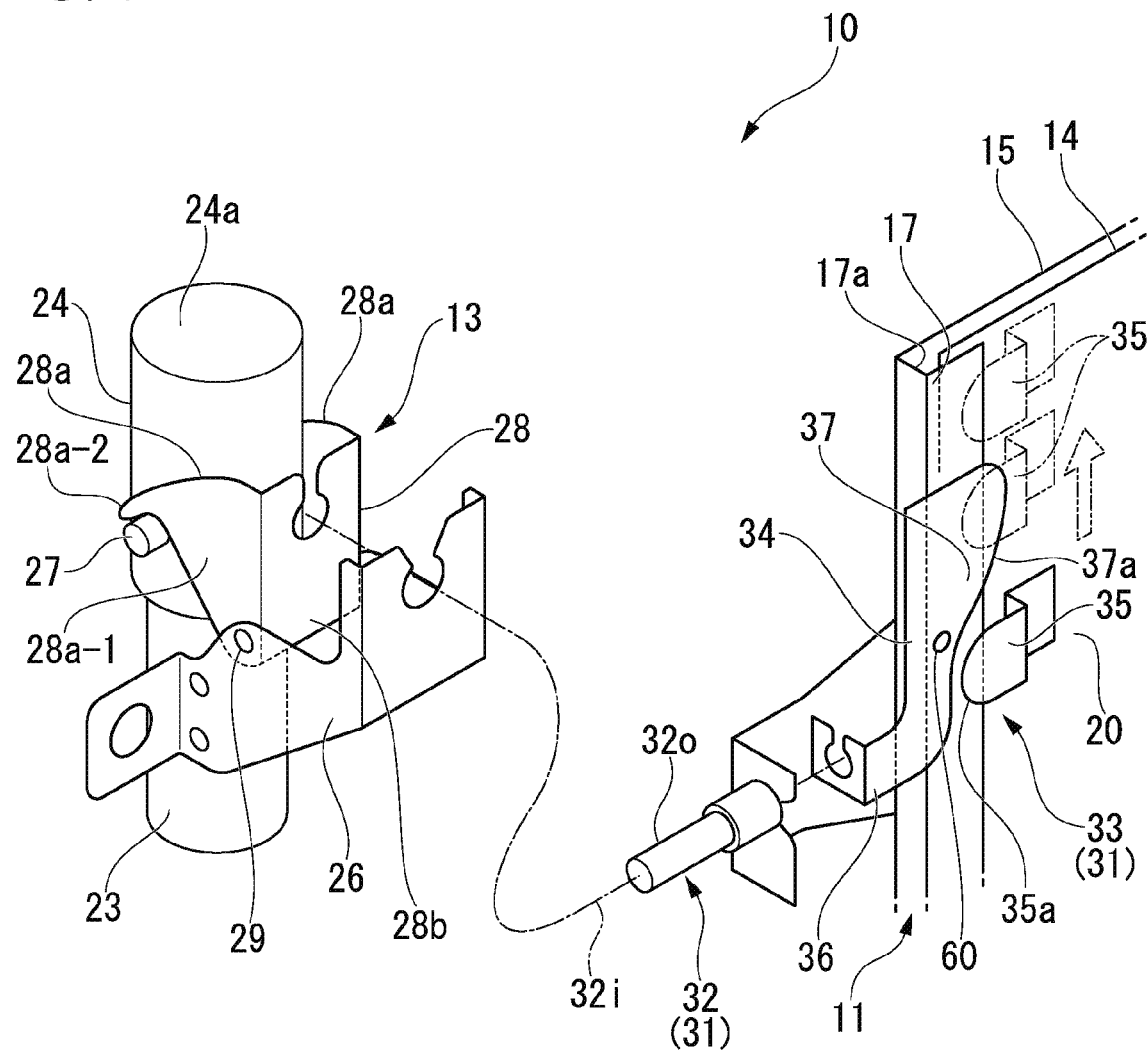
FIG. 7 is a perspective view showing a schematic configuration of the pop-up hood apparatus of the embodiment.

FIG. 7 is a perspective view showing parts of the auxiliary support sections 13 and the support mechanism 11. FIG. 8A, FIG. 8B, FIG. 8C and FIG. 8D are schematic front views of the auxiliary support sections 13, showing actions of the auxiliary support sections 13 in sequence of FIG. 8A, FIG. 8B, FIG. 8C and FIG. 8D. Further, the auxiliary support sections 13 disposed on left and right sides of the vehicle have the same basic structure.

The auxiliary support section 13 includes a columnar support rod 23, a bottomed cylindrical load receiving block 24 fitted onto the support rod 23 to be elevated, and a spring 25 (a first biasing member) interposed between the support rod 23 and the load receiving block 24 and configured to bias the load receiving block 24 upward. The support rod 23 is attached to the skeleton member of the front section of the vehicle body via a bracket 26. The load receiving block 24 has a flat apex section 24a that can abut the lower surfaces of the side edge portions of the hood 4. In addition, a pair of locking protrusions 27 protrude from an outer circumferential surface of the load receiving block 24.

In addition, the auxiliary support section 13 further includes a displacement restricting member 28 configured to restrict upward displacement of the load receiving block 24 from an initial position (a descending position) against a biasing force of the spring 25.

The displacement restricting member 28 has a pair of lever pieces 28a having substantially an L shape when seen in a front view, and both of the lever pieces 28a are connected by a connecting wall 28b. The pair of lever pieces 28a are disposed parallel to each other, and connected by the connecting wall 28b while being more widely separated than a diameter of an outer circumferential surface of the load receiving block 24. End portions of sides (hereinafter, referred to as "base end portions") of the pair of lever pieces 28a connected by the connecting wall 28b are pivotably supported on the bracket 26 by a pivot shaft 29.

Figure 8A:
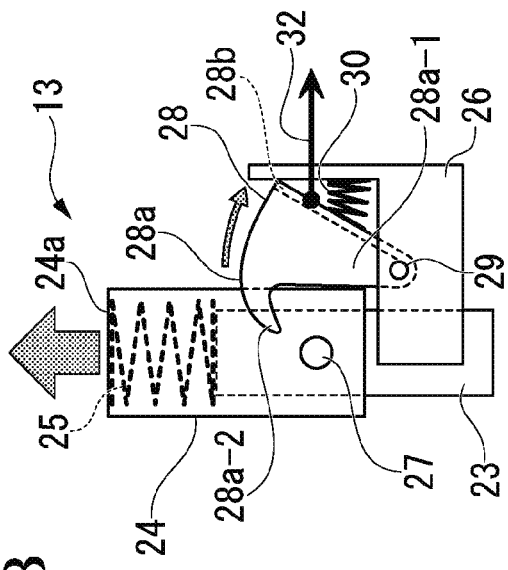
FIG. 8A is a schematic front view of a part of an auxiliary support section of the pop-up hood apparatus of the embodiment, showing an operation of the auxiliary support section.

Each of the lever pieces 28a has a base wall 28a-1 standing upward from a base end portion, and a locking wall 28a-2 extending to be bent in substantially an L shape from an upper end portion of the base wall 28a-1. In addition, as shown in FIG. 8A, FIG. 8B, FIG. 8C and FIG. 8D, the displacement restricting member 28 is pivoted and biased about the pivot shaft 29 in one direction by a spring 30 (a second biasing member). For example, the spring 30 is interposed between the connecting wall 28b of the displacement restricting member 28 and the bracket 26. As shown in FIG. 8A, a pivot biasing direction of the displacement restricting member 28 due to the spring 30 is a direction in which the locking wall 28a-2 of the lever piece 28a is engaged with the locking protrusion 27 of the load receiving block 24 from above. The lever piece 28a restricts upward displacement of the load receiving block 24 from an initial position (a descending position) against a biasing force of the spring 25 when the locking wall 28a-2 is engaged with the locking protrusion 27 of the load receiving block 24. Further, the spring 30 may be constituted by a torsion coil spring and disposed around the pivot shaft 29.

Figure 8B:
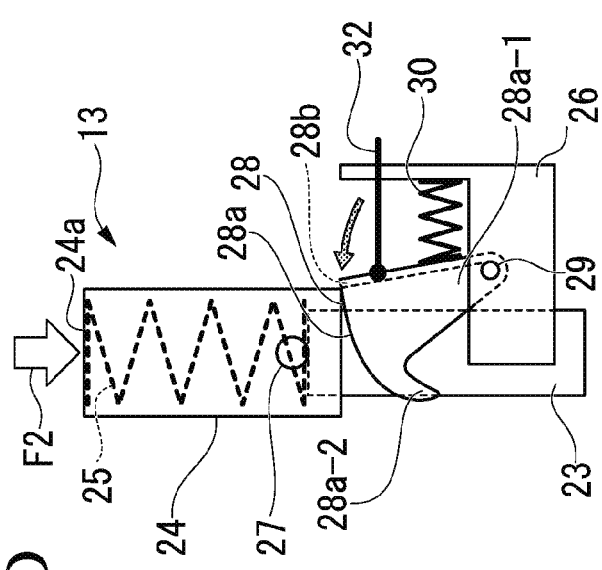
FIG. 8B is a schematic front view of a part of the auxiliary support section of the pop-up hood apparatus of the embodiment, showing an operation of the auxiliary support section.
Figure 8C:
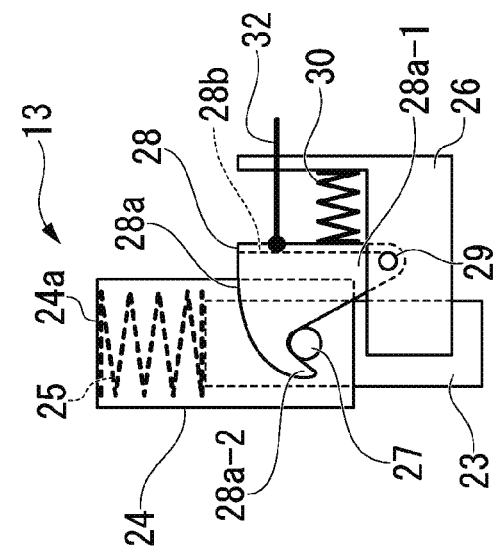
FIG. 8C is a schematic front view of a part of the auxiliary support section of the pop-up hood apparatus of the embodiment, showing an operation of the auxiliary support section.

As shown in FIG. 8B, when the displacement restricting member 28 receives an external force and is operated such that it pivots about the pivot shaft 29 in another direction (a direction opposite to a biasing direction by the spring 30), the locking walls 28a-2 of the lever pieces 28a are removed from the locking protrusions 27 of the load receiving block 24, and upward displacement of the load receiving block 24 by the spring 25 is allowed. As a result, as shown in FIG. 8C, the load receiving block 24 receives a biasing force of the spring 25 and rises. Here, the displacement restricting member 28 receives a biasing force of the spring 30 again and is pivoted in one direction, and the displacement restricting member 28 enters below the load receiving block 24.

In this state, when the hood 4 is inclined downward on one side in the vehicle width direction (the leftward/rightward direction), the load receiving block 24 is pushed downward by the lower surface of the hood 4 on the downward inclined side. Here, as shown in Fig. FIG. 8D, an upper end portion of the connecting wall 28b of the displacement restricting member 28 abuts a lower surface of the load receiving block 24, and the displacement restricting member 28 restricts downward displacement of the load receiving block 24. As a result, tilted movement of the hood 4 in the vehicle width direction is minimized.

Figure 8D:
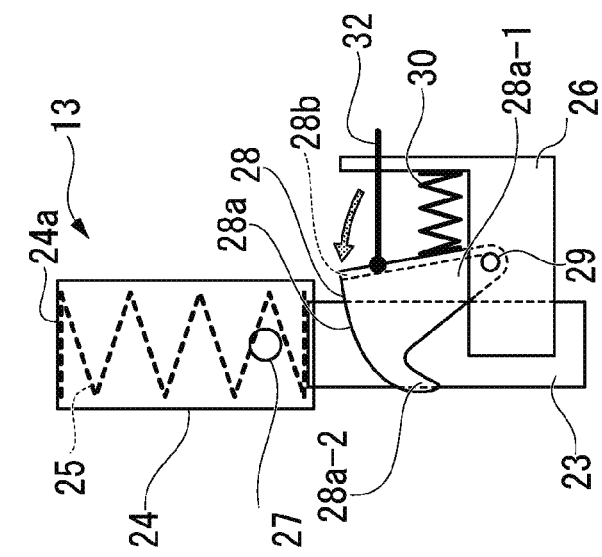
FIG. 8D is a schematic front view of a part of the auxiliary support section of the pop-up hood apparatus of the embodiment, showing an operation of the auxiliary support section.

In addition, as shown in FIG. 8D, even when a large impact F2 is input from above through the hood 4, since the upper end portion of the connecting wall 28b of the displacement restricting member 28 abuts the lower surface of the load receiving block 24, the displacement restricting member 28 restricts downward displacement of the load receiving block 24.

In addition, the auxiliary support sections 13 further includes a restriction releasing section 31 configured to release upward displacement restriction (upward displacement restriction at an initial position) of the load receiving block 24 by the displacement restricting member 28 according to upward displacement of the hood lock mechanism 9. The restriction releasing section 31 includes an operating cable 32 having one end portion connected to the connecting wall 28b of the displacement restricting member 28, and an operation converting section 33 configured to convert rising displacement of the hood lock mechanism 9 into a drawing operation of the other end portion of the operating cable 32.

The operating cable 32 includes an inner cable 32i and an outer tube 32o that slidably holds the inner cable 32i, and the inner cable 32i is connected to the connecting wall 28b of the displacement restricting member 28 and a cable drawing lever 34 (to be described below) of the operation converting section 33.

Figure 9A:
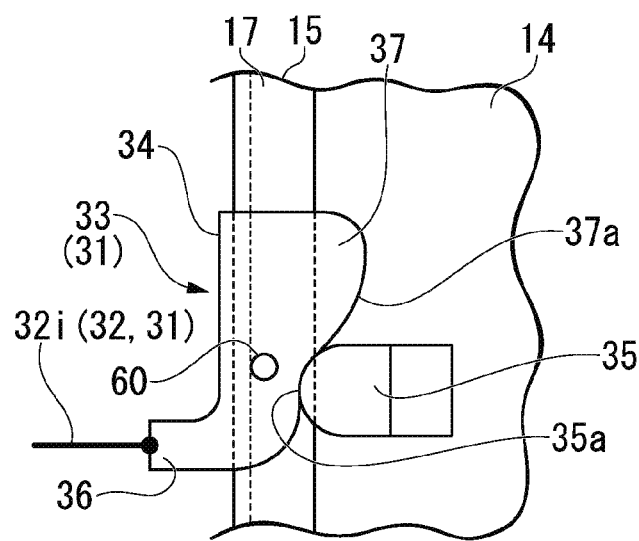
FIG. 9A is a schematic front view of an operation converting section of the pop-up hood apparatus of the embodiment, showing an operation of the operation converting section.
Figure 9B:
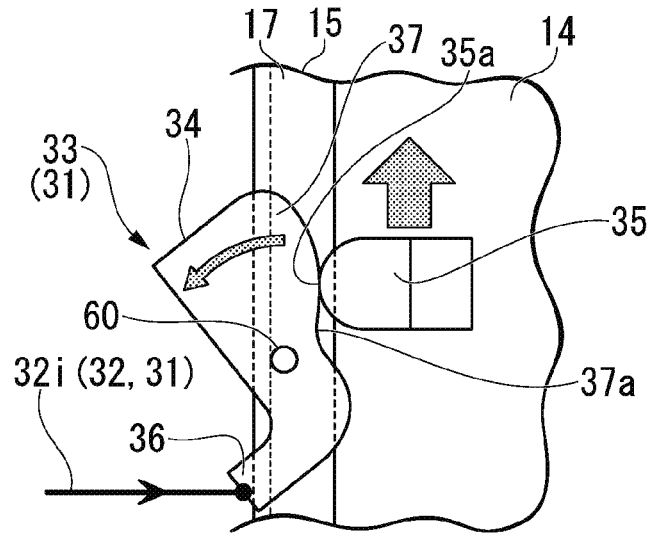
FIG. 9B is a schematic front view of the operation converting section of the pop-up hood apparatus of the embodiment, showing an operation of the operation converting section.
Figure 9C:
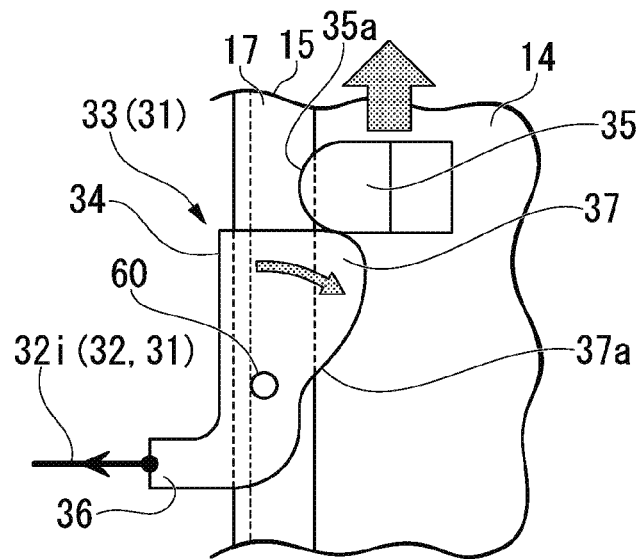
FIG. 9C is a schematic front view of the operation converting section of the pop-up hood apparatus of the embodiment, showing an operation of the operation converting section.

FIG. 9A, FIG. 9B and FIG. 9C are schematic front views of the operation converting section 33 showing operations of the operation converting section 33 in sequence of FIG. 9A, FIG. 9B and FIG. 9C. Further, in FIG. 3 to FIG. 5, for the convenience of description, description of the operation converting section 33 will be omitted.

As shown in FIG. 7, FIG. 9A, FIG. 9B and FIG. 9C, the operation converting section 33 includes the cable drawing lever 34 pivotably supported by the side edge portion of the base block 15 of the support mechanism 11, and an operation transmitting piece 35 fixedly installed on the movable block 14 of the support mechanism 11. The cable drawing lever 34 is pivotably supported by a support shaft 60 protruding from a front surface of the side edge portion of the base block 15. The cable drawing lever 34 includes a cable connecting piece 36 to which the other end portion of the operating cable 32 (the inner cable 32i) is connected, and an operation control part 37 having a cam surface 37a. The operation transmitting piece 35 on the side of the movable block 14 can abut the cam surface 37a of the operation control part 37. A curved section 35a abutting the cam surface 37a is formed in the operation transmitting piece 35.

In the embodiment, the cam surface 37a of the cable drawing lever 34 and the curved section 35a of the operation transmitting piece 35 constitute a cam mechanism.

The cable drawing lever 34 is biased by the spring 30 (see FIG. 8A, FIG. 8B, FIG. 8C and FIG. 8D) configured to bias the displacement restricting member 28 of the auxiliary support sections 13 in a direction in which the cam surface 37a abuts the curved section 35a of the operation transmitting piece 35. The cam surface 37a is formed in a curved shape such that an amount of protruding inward from the support shaft 60 in the vehicle width direction is gradually increased from a lower side toward an upper side when the operation control part 37 is in the initial state shown in FIG. 9A. For this reason, when the operation transmitting piece 35 is raised together with the movable block 14 as shown in FIG. 9B from the initial state shown in FIG. 9A, the operation control part 37 is pressed by the operation transmitting piece 35 through the cam surface 37a, and as a result, the cable drawing lever 34 is pivoted in a direction against the biasing force of the spring 30, and the cable connecting piece 36 draws the other end of the operating cable 32 (the inner cable 32i).

In addition, as shown in FIG. 9C, when the operation transmitting piece 35 is raised beyond the cable drawing lever 34, pressing of the cam surface 22b by the operation transmitting piece 35 is eliminated, and the cable drawing lever 34 receives a biasing force of the spring 30 of the auxiliary support sections 13 and returns in an initial position direction. As a result, drawing of the other end of the operating cable 32 (the inner cable 32i) by the cable connecting piece 36 is released.

Operation of Pop-Up Hood Apparatus

As shown in FIG. 2, after the impact F1 is input to a front bumper during traveling of the vehicle 1, when a large impact F2 is input to an upper surface of the hood 4 from above, the pop-up hood apparatus 10 is operated as follows.

Initially, when the impact F1 is input to the front bumper, the impact is detected by the impact detecting sensor, and the actuator 12 on a center of the front section of the vehicle body is operated on the basis of a command by a controller. When the actuator 12 is operated, the wedge section 12a of the actuator 12 passes through between the pair of locking claws 22 of the support mechanism 11, and the locking claws 22 are displaced to be slide in a locking release direction at this time. Accordingly, locking of the movable block 14 by the locking claws 22 is released, and upward displacement of the movable block 14 becomes possible. The wedge section 12a of the actuator 12 abuts the load receiving member 21 from below after passing between the pair of locking claws 22, and the movable block 14 is pushed upward through the load receiving member 21. As a result, the hood lock mechanism 9 supported by the movable block 14 is raised together with the hood 4.

Meanwhile, when the movable block 14 starts to be raised due to push-up by the actuator 12, as shown in FIG. 9B, the cable drawing lever 34 of the operation converting section 33 is pressed by the operation transmitting piece 35 and pivoted in the cable drawing direction. Accordingly, the operating cable 32 is drawn, and as shown in FIG. 8B, the displacement restricting members 28 of the left and right support mechanisms 11 is operated to be pivoted in another direction against the biasing force of the spring 30. As a result, engagement between the lever piece 28a of the displacement restricting member 28 and the locking protrusion 27 of the load receiving block 24 is released, and the load receiving block 24 receives a biasing force of the spring 25 to be displaced upward. As shown in FIG. 8C, the load receiving block 24 is displaced upward according to the rising of the hood 4, and the apex section 24a of the load receiving block 24 abuts a lower surface of the side edge portion of the hood 4.

In addition, when the hood 4 is raised by a predetermined amount or more together with the hood lock mechanism 9 (the movable block 14 of the support mechanism 11) by an actuation of the actuator 12, as shown in FIG. 9C, the operation transmitting piece 35 is displaced upward beyond the cable drawing lever 34, and the cable drawing lever 34 is pivoted in a direction in which drawing of the operating cable 32 is released.

Meanwhile, the load receiving blocks 24 of the left and right auxiliary support sections 13 are displaced upward beyond the displacement restricting member 28 at this time. When drawing of the operating cable 32 is released in this state, as shown by an arrow in FIG. 8C, the displacement restricting member 28 receives a biasing force of the spring 30 and pivots to enter below the load receiving block 24. When the load receiving block 24 starts to descend according to an input from above together with the hood 4 from this state, as shown in FIG. 8D, the upper end portion of the connecting wall 28b of the displacement restricting member 28 abuts the lower surface of the load receiving block 24. As a result, the displacement restricting member 28 is interposed between the pivot shaft 29 and the lower surface of the load receiving block 24, and the side edge portion of the hood 4 is supported by the displacement restricting member 28 from below. Accordingly, the front end portion of the hood 4 is stably held by the left and right auxiliary support sections 13.

Next, when the large impact F2 is input to the upper surface of the hood 4 from above from this state, the impact F2 is smoothly absorbed by deformation of the hood 4 or the support section thereof. In particular, in the left and right auxiliary support sections 13, when the impact F2 applied to the hood 4 is applied to the displacement restricting member 28 through the load receiving block 24, energy of the impact can be effectively absorbed as the displacement restricting member 28 is plastically deformed. Accordingly, the impact F2 can be more effectively absorbed by appropriately setting a load capacity of the displacement restricting member 28.

Variant

FIG. 10 to FIG. 13 are perspective views showing variants of the displacement restricting members.

Figure 10:
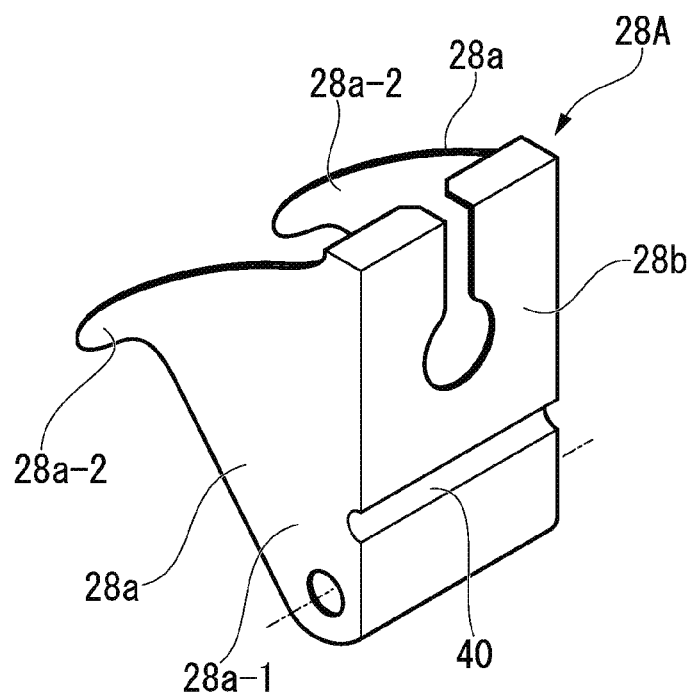
FIG. 10 is a perspective view showing a first variant of a load receiving block of the embodiment.

A displacement restricting member 28A of a first variant shown in FIG. 10 is formed such that a groove 40 having a semi-circular shape is continuously formed in the connecting wall 28b in a width direction.

Figure 11:
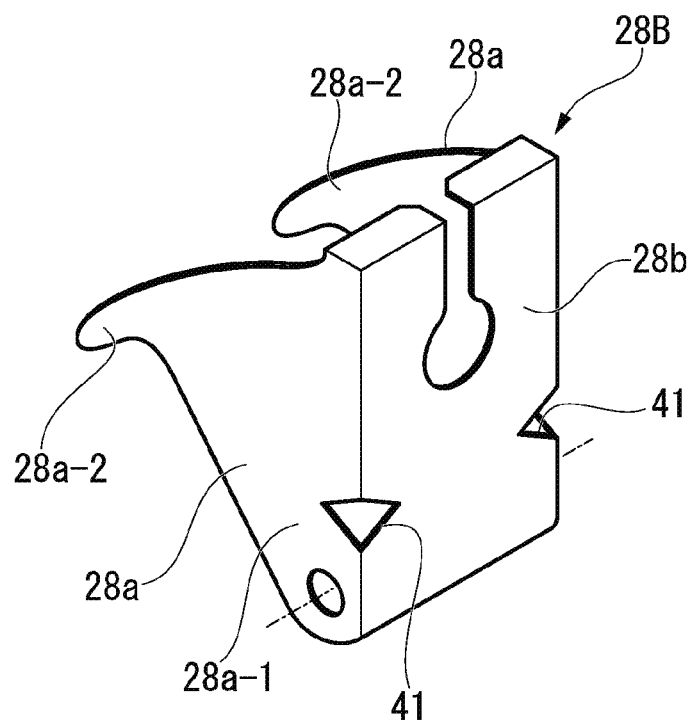
FIG. 11 is a perspective view showing a second variant of the load receiving block of the embodiment.

A displacement restricting member 28B of a second variant shown in FIG. 11 has notches 41 formed in corners between the connecting wall 28b and the left and right lever pieces 28a.

Figure 12:
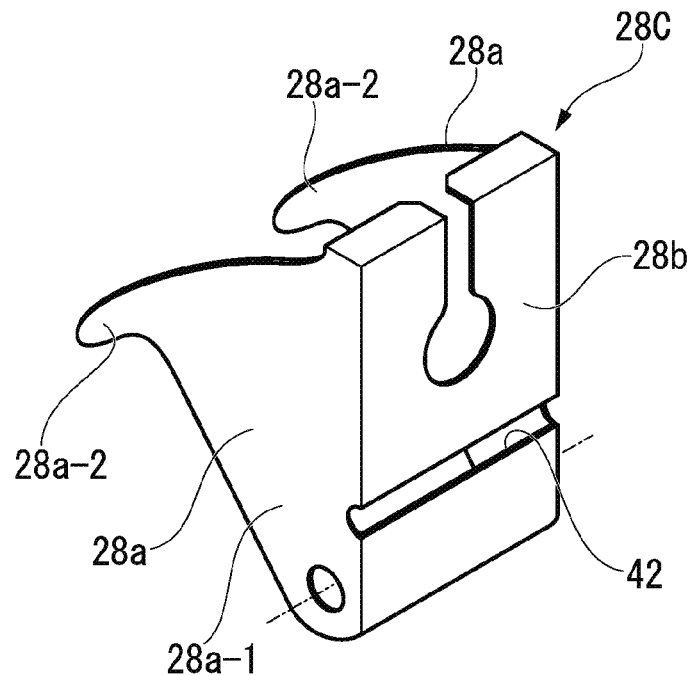
FIG. 12 is a perspective view showing a third variant of the load receiving block of the embodiment.

A displacement restricting member 28C of a third variant shown in FIG. 12 is formed such that a long hole 42 is continuously formed so that the long hole 42 is continuous with the connecting wall 28b and a part of the left and right lever pieces 28a.

In the case of the first to third variants, load capacities of the displacement restricting members 28A, 28B and 28C can be decreased.

Figure 13:
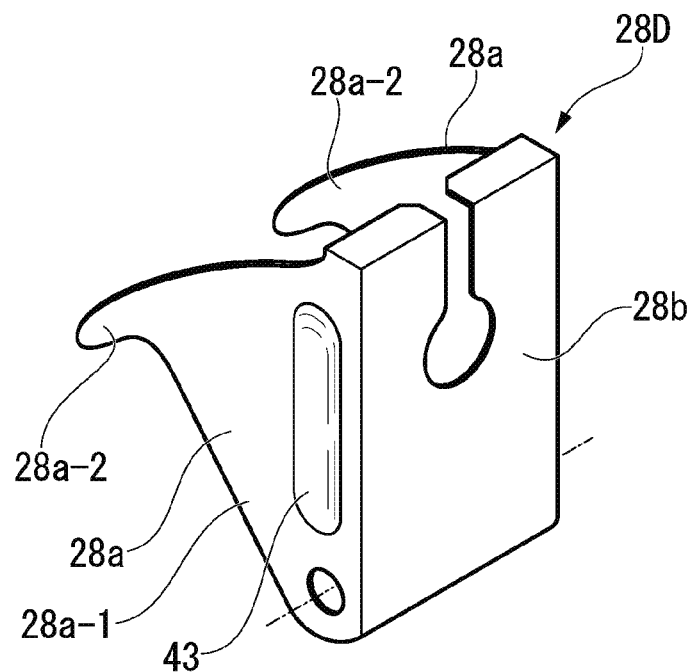
FIG. 13 is a perspective view showing a fourth variant of the load receiving block of the embodiment.

A displacement restricting member 28D of a fourth variant shown in FIG. 13 has reinforcement beads 43 formed on the base walls 28a-1 of the left and right the lever pieces 28a extending substantially in the upward/downward direction. In the case of the fourth variant, a load capacity of the displacement restricting member 28D can be increased.

Effects

The pop-up hood apparatus 10 of the embodiment is displaced to a position at which the displacement restricting member 28 abuts the lower surface of the load receiving block 24 when the load receiving block 24, upward displacement restriction of which is released, is displaced upward by a predetermined amount or more, upon rising of the hood 4 by the actuator 12. For this reason, after rising of the hood 4, downward displacement of the hood 4 can be restricted by the displacement restricting member 28 configured to restrict upward displacement of the load receiving block 24. Accordingly, in the case of the pop-up hood apparatus 10 of the embodiment, since there is no need to separately provide a dedicated restricting member configured to restrict descending of the hood 4, components can be reduced, and reduction in manufacturing costs and reduction in size and weight of the apparatus can be achieved.

In addition, the pop-up hood apparatus 10 of the embodiment includes the spring 30 configured to displace the displacement restricting member 28 between the vehicle body and the lower surface of the load receiving block 24 when the load receiving block 24, upward displacement restriction of which is released, is displaced upward by a predetermined amount or more upon rising of the hood 4 by the actuator 12. For this reason, according to a simple configuration, the lower surface of the side edge portion of the hood 4 can be rapidly supported by the displacement restricting member 28 upon rising of the hood 4.

Further, the pop-up hood apparatus 10 of the embodiment includes the lever pieces 28a in which the displacement restricting member 28 is supported to be pivotable on the side of the vehicle body and engaged with the locking protrusions 27 of the load receiving block 24 to restrict upward displacement of the load receiving block 24. Then, the lever pieces 28a can release engagement with the locking protrusions 27 according to pivotal operation in another direction by the restriction releasing section 31 while being biased to be pivoted by the spring 30 in a direction in which it is able to engage the locking protrusions 27. Further, the displacement restricting member 28 can be pivoted in one direction and abut the lower surface of the load receiving block 24 when the load receiving block 24 receives a biasing force of the spring 25 and is displaced upward by a predetermined amount or more.

Accordingly, when the configuration is employed, it is possible to realize rising displacement restriction at the initial position of the load receiving block 24 by the displacement restricting member 28 and descending displacement restriction in a raised state of the load receiving block 24 using a simple configuration.

In addition, in the pop-up hood apparatus 10 of the embodiment, the restriction releasing section 31 includes the operating cable 32 and the operation converting section 33, one end portion of the operating cable 32 is connected to the displacement restricting member 28, and the operation converting section 33 converts rising displacement of the hood lock mechanism 9 into a drawing operation of the other end portion of the operating cable 32. For this reason, rising displacement of the hood lock mechanism 9 at a substantially center in the vehicle width direction can be transmitted to the displacement restricting member 28 on a side portion in the vehicle width direction via the operating cable 32 having a high degree of deformation freedom after operation conversion. Accordingly, when the configuration is employed, even in the vehicle in which a disposition space is limited, apparatus parts can be relatively easily installed.

In particular, in the pop-up hood apparatus 10 of the embodiment, since the operation converting section 33 is constituted by the cable drawing lever 34 configured to control a pivoting amount using the cam mechanism (the curved section 35a and the cam surface 37a), drawing of the operating cable 32 can be accurately controlled according to a shape of the cam surface 37a. Accordingly, when the configuration is employed, the displacement restricting member 28 can be displaced as desired according to the rising displacement of the hood 4.

Another Embodiment

Figure 14:
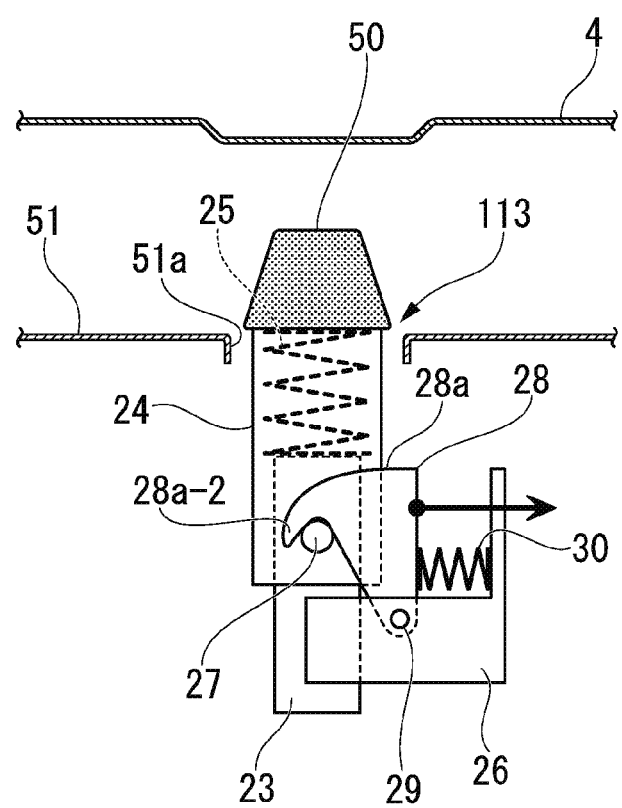
FIG. 14 is a schematic front view of an auxiliary support section of a pop-up hood apparatus of another embodiment.

FIG. 14 is a schematic front view of an auxiliary support section 113 of a pop-up hood apparatus of another embodiment. Further, in FIG. 14, common reference signs designate the same portions as those in the embodiment.

While a basic configuration of the auxiliary support section 113 of the other embodiment is substantially the same as that of the embodiment, a stopper rubber 50 is integrally attached to an upper section of the load receiving block 24. The stopper rubber 50 is a member protruding upward from an upper surface of a circumferential edge member 51 of an opening section of the vehicle body and configured to elastically support the lower surface of the hood 4 during normal traveling. In the embodiment, in a state in which the load receiving block 24 is at the initial position, the stopper rubber 50 protrudes upward through an opening 51a of the circumferential edge member 51. Accordingly, the stopper rubber 50 can abut the lower surface of the hood 4 during normal traveling.

In the pop-up hood apparatus of the embodiment, since the stopper rubber 50 is integrally attached to the upper section of the load receiving block 24, in comparison with the case in which the load receiving block 24 and the stopper rubber 50 are separately installed on the vehicle body, a space occupied by the parts at the circumferential edge of the opening section of the vehicle body can be reduced. Further, the embodiment has an advantage that an impact when the load receiving block 24 abuts the lower surface of the hood 4 can be reduced by the stopper rubber 50 during raising of the hood 4 by the actuator 12.

Further, the present invention is not limited to the embodiment, and various design changes may be made without departing from the scope of the present invention. For example, while the restriction releasing section 31 is constituted by the operating cable 32 and the cable drawing lever 34 that is the operation converting section 33 in the embodiment, the restriction releasing section is not limited to these configurations, and for example, may be a configuration in which rising displacement of the hood lock mechanism is converted into rotation of a pinion by a rack and pinion mechanism and an operating cable is drawn by rotation of the pinion. In addition, rising displacement of the hood lock mechanism may be detected by a sensor, and the displacement restricting member may be operated by an actuator according to the detection result.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A pop-up hood apparatus for a vehicle comprising:
    a hood configured to close an opening section of an external section of a vehicle body;
    a hood lock mechanism configured to fix a substantially central section of the hood in a vehicle width direction to a side of a vehicle body;
    an actuator configured to displace the hood upward together with the hood lock mechanism in a case a predetermined condition is satisfied;
    an auxiliary support section configured to support a side edge portion of the hood from below in a case the hood is displaced upward according to an actuation of the actuator, and
    a second biasing member configured to displace the displacement restricting member in between the vehicle body and the lower surface of the load receiving block in a case the load receiving block that has been released the upward displacement restriction is displaced upward at the predetermined amount or more,
    wherein the auxiliary support section comprises:
    a load receiving block configured to support the side edge portion of the hood from below;
    a first biasing member configured to bias the load receiving block upward;
    a displacement restricting member configured to restrict upward displacement of the load receiving block from an initial position against a biasing force of the first biasing member; and
    a restriction releasing section configured to release upward displacement restriction of the load receiving block by the displacement restricting member according to upward displacement of the hood lock mechanism,
    the displacement restricting member is configured to be displaceable to a position at which the displacement restricting member abuts a lower surface of the load receiving block in a case the load receiving block that has been released the upward displacement restriction is displaced upward by a predetermined amount or more,
    the load receiving block has a locking protrusion protruding outward from a side surface,
    the displacement restricting member has a lever piece pivotably supported on the side of the vehicle body and engaged with the locking protrusion to restrict upward displacement of the load receiving block,
    the lever piece that is pivotably biased by the second biasing member in one direction in which it is engageable with the locking protrusion and that is configured to release engagement with the locking protrusion by a pivotal operation in another direction by the restriction releasing section, and
    the displacement restricting member is configured to pivot in the one direction and abut the lower surface of the load receiving block in a case the load receiving block receives the biasing force of the first biasing member and is displaced upward by the predetermined amount or more.

2. The pop-up hood apparatus for a vehicle according to claim 1, wherein the predetermined condition is a condition of determining that there is in an emergency.

3. The pop-up hood apparatus for a vehicle according to claim 1, wherein the restriction releasing section comprises:
    an operating cable having one end portion connected to the displacement restricting member; and
    an operation converting section configured to convert rising displacement of the hood lock mechanism into a drawing operation of other end portion of the operating cable.

4. The pop-up hood apparatus for a vehicle according to claim 3, wherein the operation converting section is constituted by a cable drawing lever, a pivoting amount of which is controlled by a cam mechanism.

5. The pop-up hood apparatus for a vehicle according to claim 1, wherein a stopper rubber that is configured to abut the lower surface of the hood is provided on an upper section of the load receiving block in a state in which the load receiving block is at an initial position.

* * * * *